US012649540B2

(12) United States Patent
Kuo

(10) Patent No.: US 12,649,540 B2
(45) Date of Patent: Jun. 9, 2026

(54) HANDLEBAR STABILIZER

(71) Applicant: A-PRO TECH CO., LTD., Taichung City (TW)

(72) Inventor: Chih Ping Kuo, Taichung City (TW)

(73) Assignee: A-PRO TECH CO., LTD., Taichung City (TW)

( * ) Notice: Subject to any disclaimer, the term of this patent is extended or adjusted under 35 U.S.C. 154(b) by 379 days.

(21) Appl. No.: 18/488,003

(22) Filed: Oct. 16, 2023

(65) Prior Publication Data

US 2024/0239435 A1    Jul. 18, 2024

(30) Foreign Application Priority Data

Jan. 18, 2023    (CN) .......................... 202310090672.5

(51) Int. Cl.
*B62K 21/08*        (2006.01)
*B62K 19/32*        (2006.01)

(52) U.S. Cl.
CPC .............. *B62K 21/08* (2013.01); *B62K 19/32* (2013.01)

(58) Field of Classification Search
CPC ..................................................... B62K 21/08
See application file for complete search history.

(56) References Cited

U.S. PATENT DOCUMENTS

| | | | | |
|---|---|---|---|---|
| 1,799,806 | A * | 4/1931 | Thomsen ............... | B62K 21/08 |
| | | | | 280/279 |
| 5,516,133 | A | 5/1996 | Motrenec et al. | |
| 6,892,604 | B2 | 5/2005 | Tison et al. | |
| 10,421,517 | B2 * | 9/2019 | Coaplen ................. | B62K 19/32 |
| 12,270,437 | B2 * | 4/2025 | Wei .......................... | F16C 33/32 |
| 2024/0286703 | A1 * | 8/2024 | Lai .......................... | B62K 21/06 |
| 2025/0019028 | A1 * | 1/2025 | Lai .......................... | B62K 19/32 |

FOREIGN PATENT DOCUMENTS

| | | |
|---|---|---|
| CN | 102444660 | 7/2014 |
| CN | 215361708 | 12/2021 |
| TW | 327158 | 2/1998 |
| WO | 2016144853 | 9/2016 |

* cited by examiner

*Primary Examiner* — Kevin Hurley
(74) *Attorney, Agent, or Firm* — JCIPRNET

(57) ABSTRACT

A handlebar stabilizer adapted to be disposed on a vehicle frame is provided. The vehicle frame includes a steerer tube and a head tube. The steerer tube and the head tube are disposed coaxially. The head tube is sleeved on the steerer tube. The handlebar stabilizer includes a rotating member, a cover, and a shock absorbing assembly. The rotating member is sleeved on and linked with the steerer tube. An outer edge is formed on the circumference of the rotating member. The cover is sleeved on the rotating member and linked with the head tube. The shock absorbing assembly is disposed around the rotating member and includes at least one outwardly extending section and at least one fixed section. The fixed section is fixed to the cover. When the outer edge abuts against the outwardly extending section, the outwardly extending section extends outwardly in the radial direction.

8 Claims, 9 Drawing Sheets

110  116

HANDLEBAR STABILIZER

CROSS-REFERENCE TO RELATED APPLICATION

This application claims the priority benefit of China application serial no. 202310090672.5, filed on Jan. 18, 2023. The entirety of the above-mentioned patent application is hereby incorporated by reference herein and made a part of this specification.

BACKGROUND

Technical Field

The present invention relates to a stabilizer, and particularly relates to a handlebar stabilizer.

Description of Related Art

Generally, non-motorized vehicles often include a steering system with handlebars so that the user may control the direction of the vehicle. Taking a bicycle as an example, a rider may hold the handlebars and turn the stem of the bicycle to change the moving direction of the bicycle body. However, when the bicycle body is heavy or the terrain is rugged, the stem will experience high-frequency vibration during its rotation, resulting in poor stability of the bicycle, which is not conducive to the rider's control and reduces comfort when holding the handlebars.

SUMMARY

The invention is directed to a handlebar stabilizer, which may improve the stability of a vehicle frame.

According to an embodiment of the invention, a handlebar stabilizer is adapted to be disposed on a vehicle frame. The vehicle frame includes a steerer tube and a head tube. The steerer tube and the head tube are disposed coaxially. The head tube is sleeved on the steerer tube. The handlebar stabilizer includes a rotating member, a cover, and a shock absorbing assembly. The rotating member is sleeved on the steerer tube and linked with the steerer tube. An outer edge is formed on a circumference of the rotating member. The cover is disposed on the rotating member and linked with the head tube. The shock absorbing assembly is disposed around the rotating member and includes at least one outwardly extending section and at least one fixed section. The at least one fixed section of the shock absorbing assembly is fixed to the cover. When the outer edge of the rotating member abuts against the at least one outwardly extending section of the shock absorbing assembly, the at least one outwardly extending section of the shock absorbing assembly extends outwardly in a radial direction of the rotating member.

In the handlebar stabilizer according to an embodiment of the invention, the shock absorbing assembly includes at least one first elastic sheet and at least one second elastic sheet at least partially alternatively stacked, each of the at least one first elastic sheet includes a first notch, each of the at least one second elastic sheet includes a second notch, and the first notch and the second notch are oriented in different directions.

In the handlebar stabilizer according to the embodiment of the invention, a cross section of each of the at least one first elastic sheet and a cross section of each of the at least one second elastic sheet of the shock absorbing assembly are C-shaped, each of the at least one first elastic sheet is formed with a first moving end, the at least one second elastic sheet is formed with a second moving end, the first moving end of the at least one first elastic sheet and the second moving end of the at least one second elastic sheet are at least partially overlapped to form the outwardly extending section.

In the handlebar stabilizer according to an embodiment of the invention, a region of the circumference of the rotating member that the first notch of the at least one first elastic sheet corresponds to is different from a region of the circumference of the rotating member that the second notch of the at least one second elastic sheet corresponds to.

In the handlebar stabilizer according to an embodiment of the invention, the rotating member has a first radial axis and a second radial axis, a length of the first radial axis is greater than a length of the second radial axis, and the outer edge is formed on the first radial axis.

In the handlebar stabilizer according to the embodiment of the invention, the head tube has an opening end, a cup assembly is fixed to the head tube and is located at the opening end, the steerer tube extends from the opening end, the handlebar stabilizer is disposed at one end of the cup assembly in an axial direction of the opening end, and the handlebar stabilizer and the cup assembly are coaxially disposed.

In the handlebar stabilizer according to the embodiment of the invention, the cover has a first end and a second end opposite to each other in an extension direction, and the second end of the cover has a first fixed portion, the cup assembly has a third end and a fourth end opposite to each other in the extension direction, the third end of the cup assembly has a second fixed portion, and the first fixed portion of the cover is fixed to the second fixed portion of the cup assembly.

In the handlebar stabilizer according to an embodiment of the invention, the outer edge includes a first pushing end and a second pushing end opposite to each other, the first pushing end and the second pushing end abut against an inner circumference of the shock absorbing assembly.

In the handlebar stabilizer according to the embodiment of the invention, the handlebar stabilizer further includes a collar, which is sleeved on and fixed on the rotating member.

The handlebar stabilizer of the invention is adapted to be disposed on the vehicle frame, including the rotating member, the cover, and the shock absorbing assembly. The rotating member is sleeved on and linked with the steerer tube of the vehicle frame. The outer edge is formed on the circumference of the rotating member. The shock absorbing assembly includes at least one outwardly extending section and at least one fixed section, and is disposed around the rotating member. When the steerer tube drives the rotating member to rotate, the outer edge of the rotating member abuts against the at least one outwardly extending section of the shock absorbing assembly, and thus the outer edge is resisted, and the at least one outwardly extending section of the shock absorbing assembly extends outwardly in the radial direction of the rotating member, resulting in progressive resistance. Therefore, the high-frequency wobbling of the steerer tube may be reduced to realize stability, enhancing the user's comfort.

3

Figure 2A:
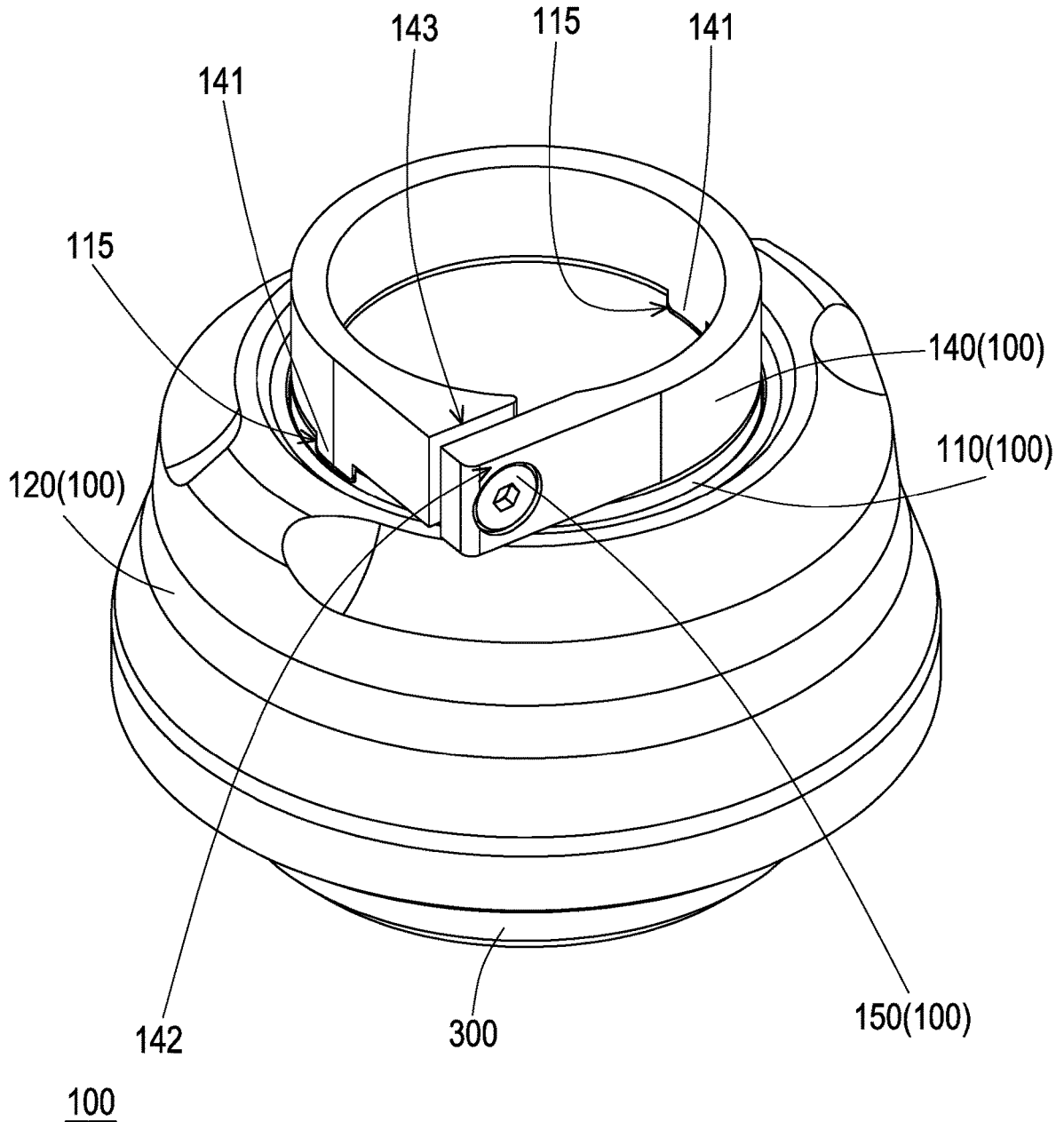
FIG. 2A is a schematic view of the handlebar stabilizer of FIG. 1.
Figure 2B:
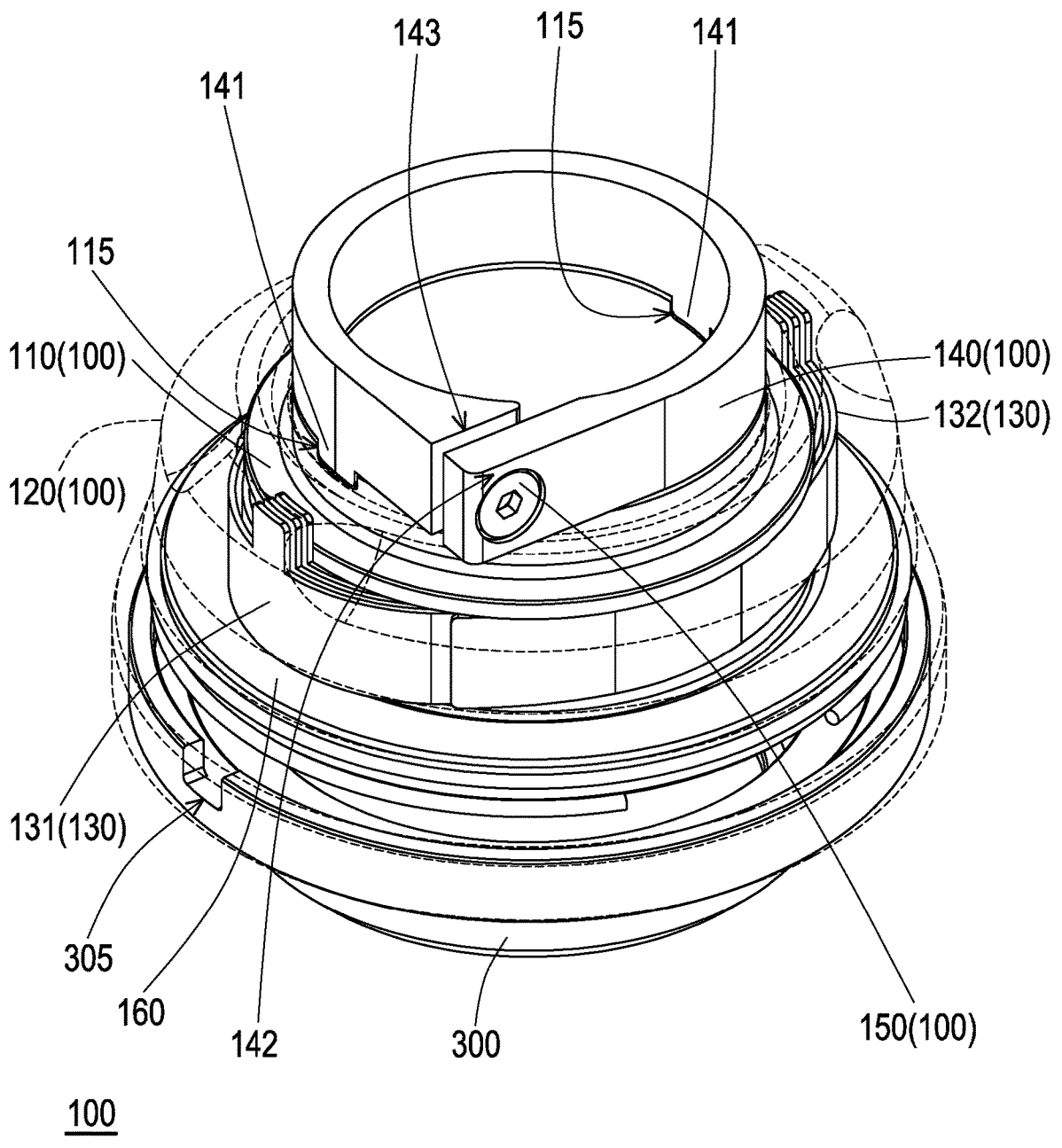

FIG. 2B is a schematic view of the handlebar stabilizer of FIG. 2A with the cover hidden.

Figure 1:
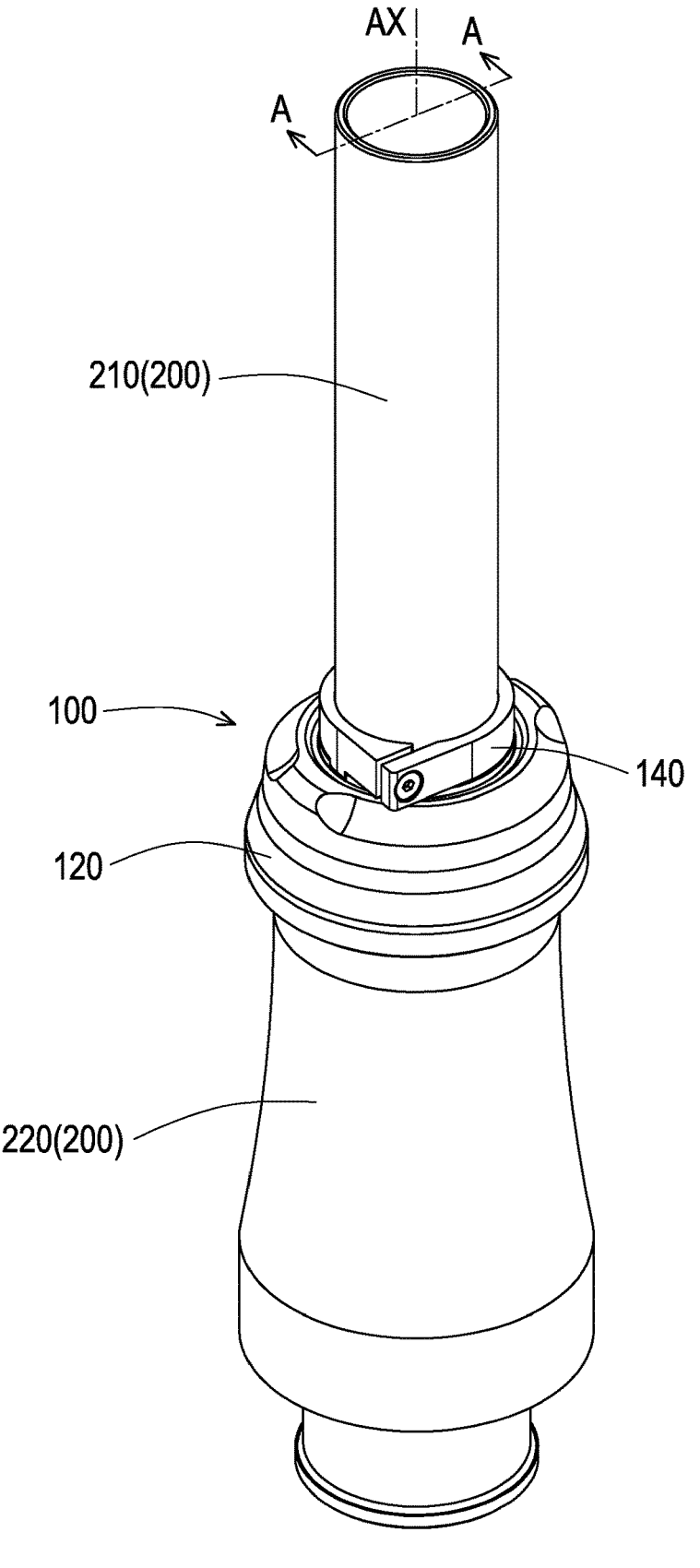
FIG. 1 is a schematic view of a handlebar stabilizer and a vehicle frame according to an embodiment of the invention.
Figure 3:
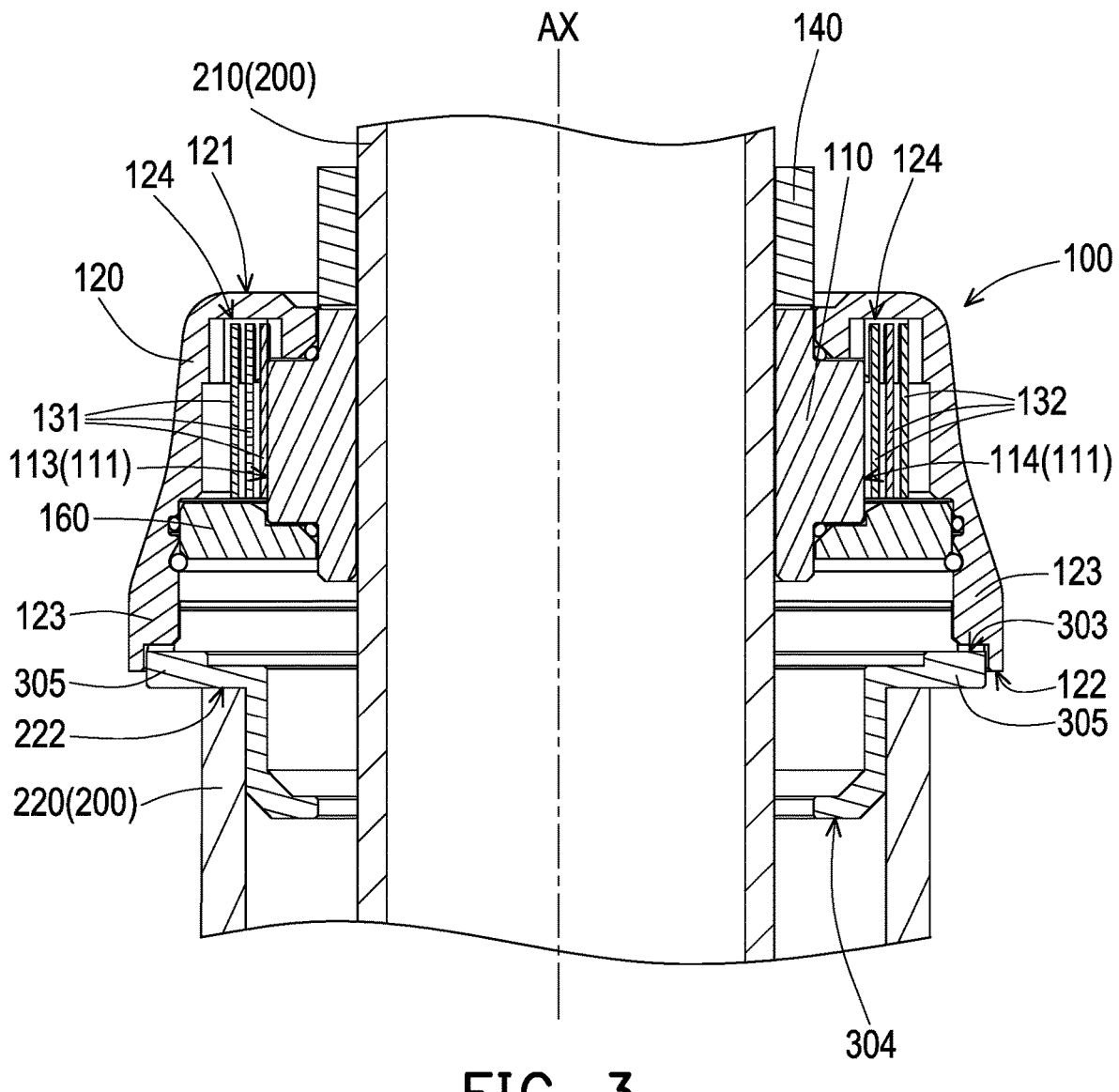

FIG. 3 is a cross-sectional view of the handlebar stabilizer and vehicle frame of FIG. 1 along line A-A.

Figure 4:
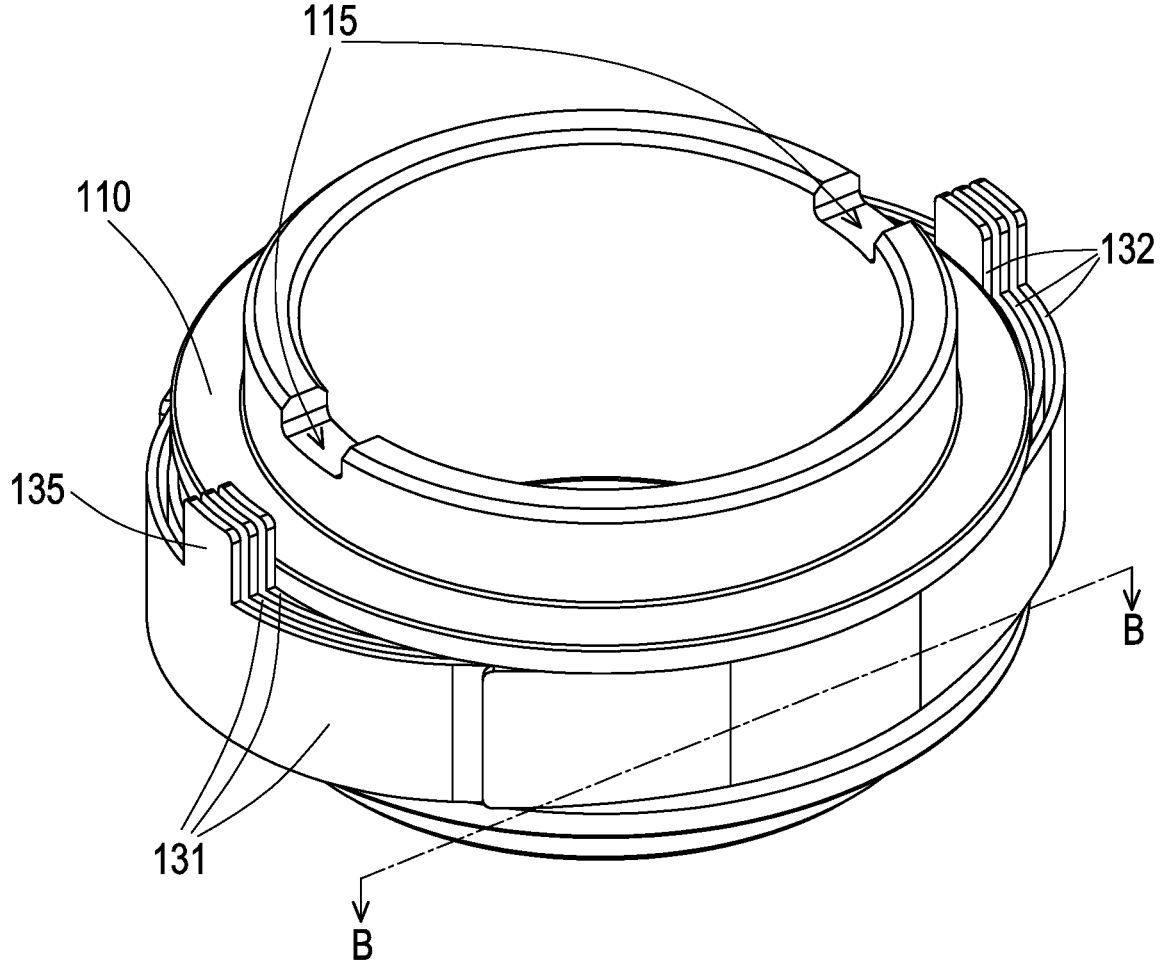

FIG. 4 is a schematic view of the rotating member and the shock absorbing assembly of the handlebar stabilizer of FIG. 2A.

Figure 5:
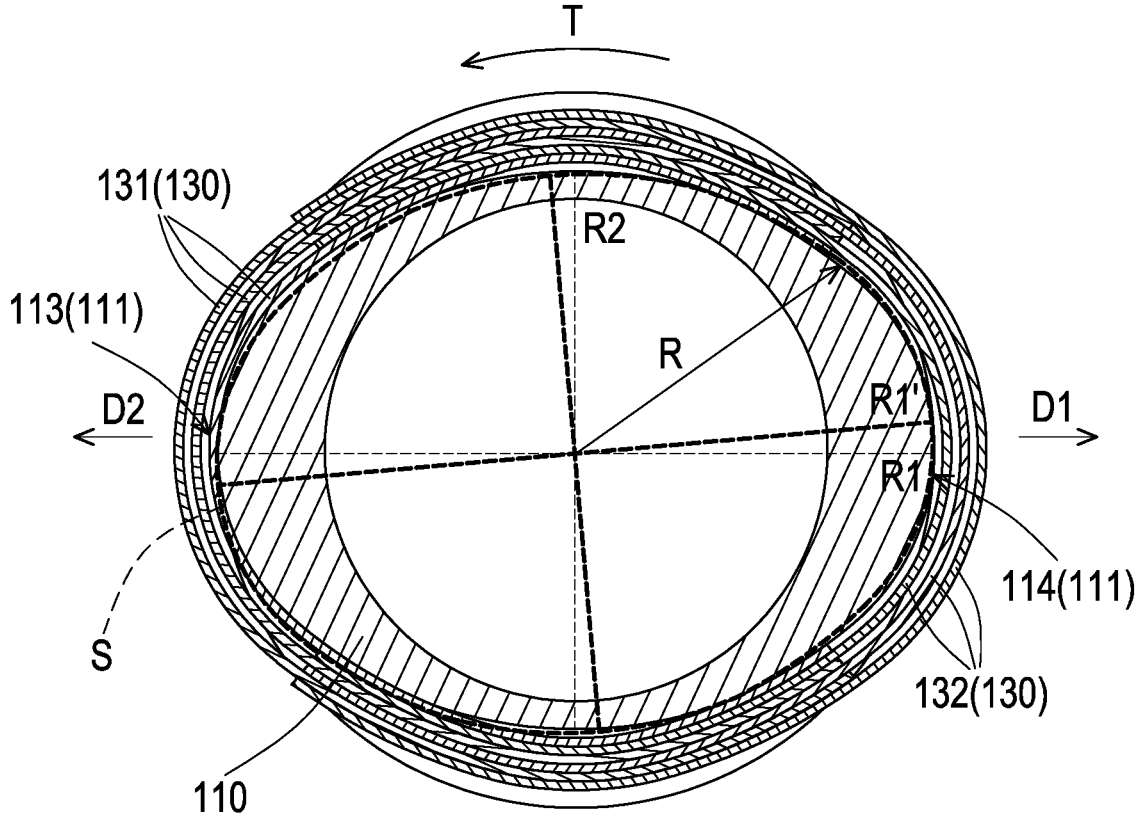

FIG. 5 is a cross-sectional view of the rotating member and the shock absorbing assembly of the handlebar stabilizer of FIG. 4 along line B-B.

Figure 6:
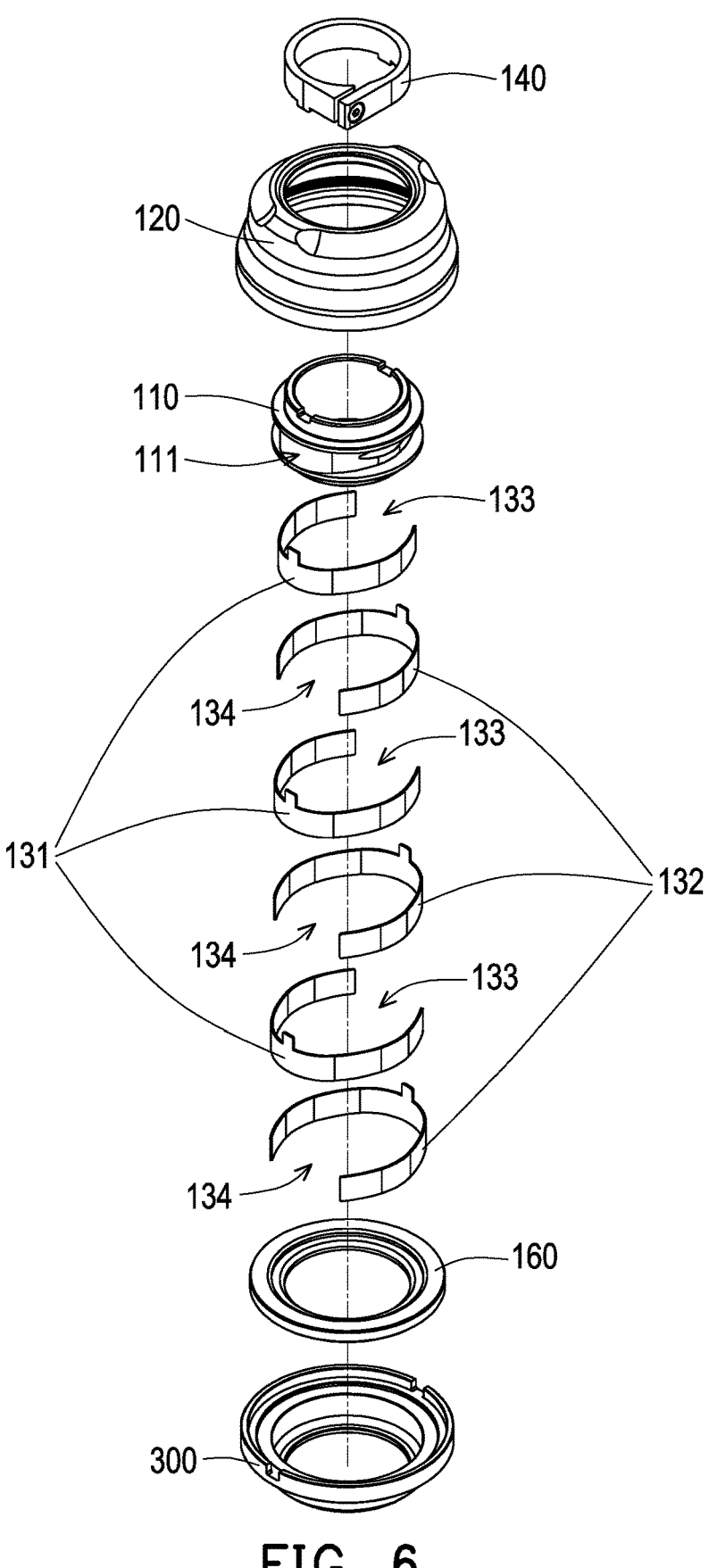

FIG. 6 is an exploded view of the handlebar stabilizer of FIG. 2A.

Figure 7:
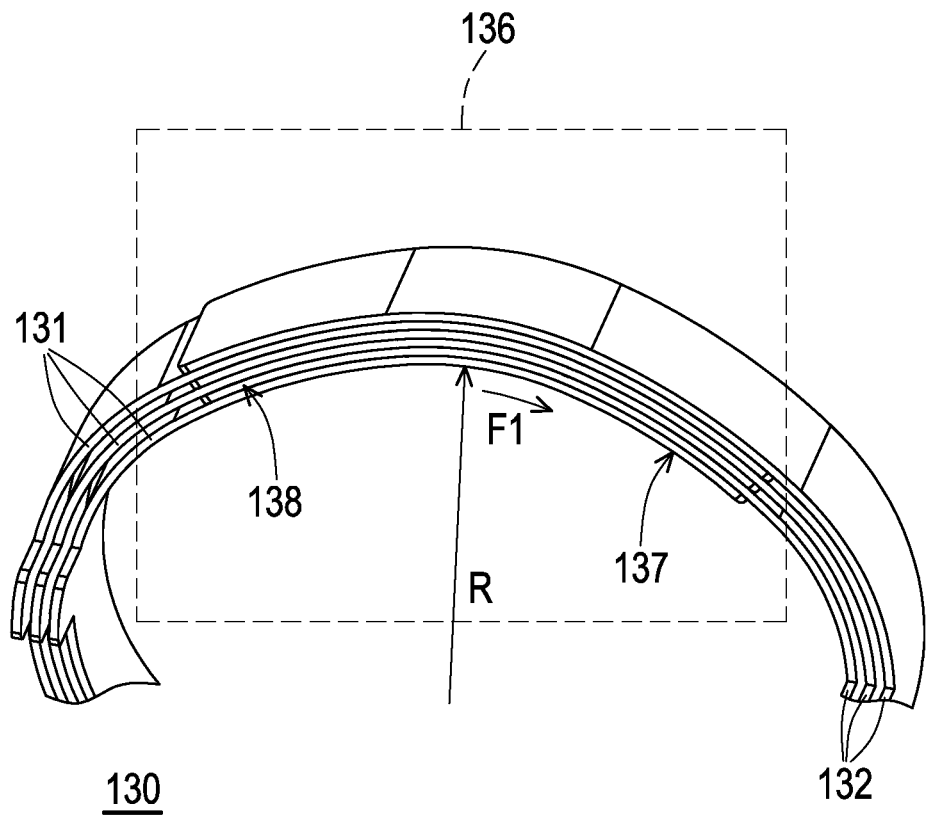

FIG. 7 is a partial schematic view of the shock absorbing assembly of the handlebar stabilizer of FIG. 4 from another angle of view.

Figure 8:
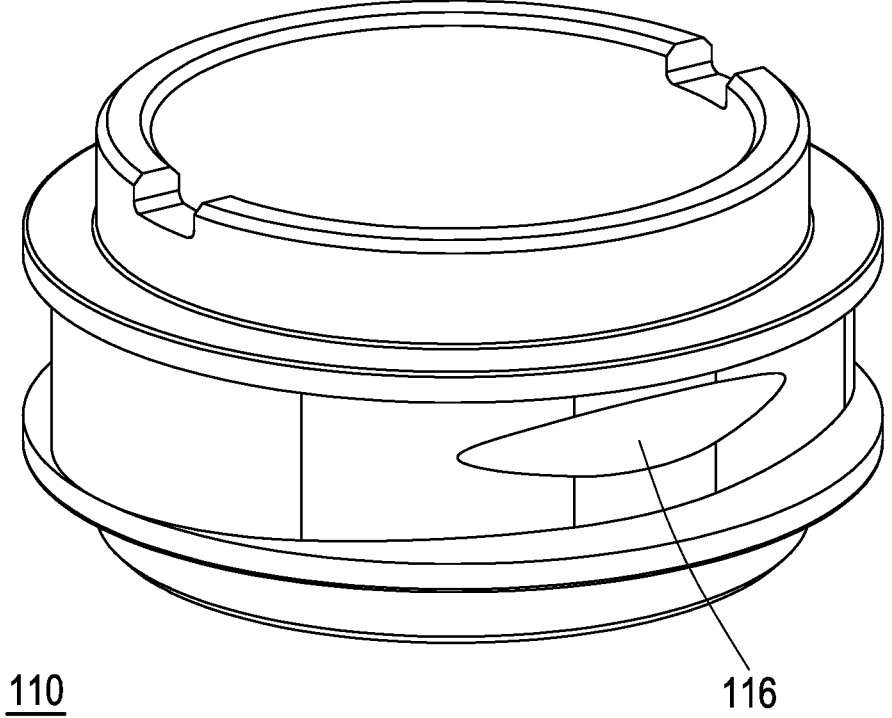

FIG. 8 is a schematic view of the rotating member of the handlebar stabilizer in FIG. 4 from another angle of view.

DESCRIPTION OF THE EMBODIMENTS

Reference will now be made in detail to the exemplary embodiments of the invention. examples of which are illustrated in the accompanying drawings. Wherever possible, the same reference numbers are used in the drawings and descriptions to refer to the same or like parts.

FIG. 1 is a schematic view of a handlebar stabilizer and a vehicle frame according to an embodiment of the invention. To clearly and concisely present the configuring correlation between a handlebar stabilizer and a vehicle frame, the vehicle frame in FIG. 1 is illustrated as a part of an actual vehicle frame. Referring to FIG. 1, the vehicle frame 200 includes a steerer tube 210 and a head tube 220 in the embodiment. The steerer tube 210 and the head tube 220 are disposed coaxially (that is, the common axis is an axial direction AX), and the head tube 220 is sleeved on the steerer tube 210.

The vehicle frame 200 in the embodiment may be, for example, a vehicle frame of a bicycle or a kick scooter, but the type of the vehicle frame 200 is not limited thereto. Taking a bicycle as an example, the steerer tube 210 is, for example, a vertical tube, which may connect to a stem and handlebars of the bicycle at the top and may connect to a fork or even to a wheel of the bicycle at the bottom. The head tube 220 is, for example, a head tube, which may connect a top tube and a down tube to form the main structure of the vehicle body. The user may rotate the steerer tube 210 with the handlebars to control the traveling direction of the vehicle body.

FIG. 2A is a schematic view of the handlebar stabilizer of FIG. 1. FIG. 2B is a schematic view of the handlebar stabilizer of FIG. 2A with the cover hidden. FIG. 3 is a cross-sectional view of the handlebar stabilizer and vehicle frame of FIG. 1 along line A-A. It should be noted that, in order to clearly illustrate the internal structure of the handlebar stabilizer, the cover in FIG. 2B is drawn with dotted lines.

Referring to FIG. 2A, FIG. 2B, and FIG. 3, the handlebar stabilizer 100 is adapted to be disposed on the vehicle frame 200 (FIG. 3) in the embodiment. The handlebar stabilizer 100 includes a rotating member 110, a cover 120, a shock absorbing assembly 130, and a collar 140. The rotating member 110 is sleeved on the steerer tube 210 (FIG. 3) and is linked with the steerer tube 210. The cover 120 is sleeved on the rotating member 110, the shock absorbing assembly 130 is assembled between the rotating member 110 and the cover 120 and is linked with the head tube 220 (FIG. 3) (that is, the cover 120 is fixed to the head tube 220). The cover 120 includes a carrying member 160, and the carrying member 160 is sleeved on the steerer tube 210 to carry the rotating member 110, so as to firmly fix the rotating member 110 to the cover 120.

In the embodiment, the collar 140 is sleeved on the steerer tube 210 and fixed on the rotating member 110, the stem (not illustrated) is assembled on the rotating member 110, and one end of the stem is pressed against the collar 140, so when the stem rotates, the steerer tube 210 is driven to rotate, thereby preventing the stem and the steerer tube 210 from moving differently.

In detail, the collar 140 is, for example, C-shaped, and has two ends 142, 143 and a third fixed portion 141 (for example, a protruding portion). A locking member 150 passes through the end 142 and is locked to the end 143 to fix the collar 140 to the steerer tube 210. The rotating member 110 has a fourth fixed portion 115 (for example, a recess) corresponding to the third fixed portion 141, so that the third fixed portion 141 of the collar 140 is engaged with the fourth fixed portion 115 of the rotating member 110. Of course, the manner in which the collar 140 is fixed to the steerer tube 210 and the rotating member 110 is not limited thereto. Through the cooperation of the locking member 150, the third fixed portion 141, and the fourth fixed portion 115, when the steerer tube 210 rotates, the rotating member 110 may rotate with the steerer tube 210.

In addition, both the number of the third fixed portion 141 and the number of the fourth fixed portion 115 in the embodiment are two, but the number of the third fixed portion 141 and the number of the fourth fixed portion 115 are not limited thereto.

As shown in FIG. 3, the head tube 220 has an opening end 222, and the steerer tube 210 extends out of the opening end 222. A cup assembly 300, surrounding the steerer tube 210, is fixed on the head tube 220 and is located at the opening end 222 of the head tube 220. The handlebar stabilizer 100 is disposed on one end of the cup assembly 300 in the axial direction AX of the opening end 222, and the handlebar stabilizer 100 and the cup assembly 300 are coaxially disposed (that is, the common axis is the axial direction AX). Specifically, the cover 120 has a first end 121 and a second end 122 opposite to each other in the extension direction (i.e., the axial direction AX), and the second end 122 of the cover 120 has a first fixed portion 123 (for example, a protruding portion).

On the other hand, the cup assembly 300 has a third end 303 and a fourth end 304 opposite to each other in the extension direction (i.e., the axial direction AX), and the third end 303 of the cup assembly 300 has a fixed portion 305 (for example, a concave portion) corresponding to the first fixed portion 123. The first fixed portion 123 of the cover 120 is engaged with the second fixed portion 305 of the cup assembly 300, so that the cover 120 is fixed on the cup assembly 300 and does not move with the steerer tube 210. Of course, the manner in which the cover 120 is fixed to the cup assembly 300 is not limited thereto.

FIG. 4 is a schematic view of the rotating member and the shock absorbing assembly of the handlebar stabilizer of FIG. 2A. FIG. 5 is a cross-sectional view of the rotating member and the shock absorbing assembly of the handlebar stabilizer of FIG. 4 along line B-B. It should be noted that FIG. 5 schematically illustrates an example in which the rotating member rotates to a position S with dotted lines. Referring to FIG. 4 and FIG. 5, the section shape of the rotating member 110 in the embodiment is, for example, elliptical, but the shape of the rotating member 110 is not limited thereto.

The rotating member 110 has a first radial axis R1 (FIG. 5) and a second radial axis R2 (FIG. 5), the first radial axis R1 and the second radial axis R2 are perpendicular to each other, and a length of the first radial axis R1 is greater than a length of the second radial axis R2. An outer edge 111 is formed on a circumference of the rotating member 110 (FIG. 5). The outer edge 111 includes a first pushing end 113 (FIG. 5) and a second pushing end 114 (FIG. 5) opposite to the first pushing end 113, both formed in the direction of the first radial axis R1. That is, the first pushing end 113 and the second pushing end 114 are respectively located on opposite sides of the first radial axis R1.

In the embodiment, the handlebar stabilizer 100 further includes the shock absorbing assembly 130. The shock absorbing assembly 130 includes at least one first elastic sheet 131 and at least one second elastic sheet 132 at least partially alternatively stacked, which are disposed around the rotating member 110 and correspond to the outer edge 111. The at least one first elastic sheet 131 in the embodiment is a plurality of first elastic sheets 131 (three are illustrated), and the at least one second elastic sheet 132 is a plurality of second elastic sheets 132 (three are illustrated). The first elastic sheets 131 and the second elastic sheets 132 are partially alternatively stacked to be disposed on the rotating member 110 in a radial direction R of the rotating member 110, and together surround the rotating member 110, providing the rotating member 110 with proper resistance to enhance the stability of the steerer tube 210 (FIG. 1). The manner in which the shock absorbing assembly 130 provides resistance will be described in more detail below.

FIG. 6 is an exploded view of the handlebar stabilizer of FIG. 2A. Referring to FIG. 5 and FIG. 6, furthermore, each of the first elastic sheets 131 has a C-shaped cross section and a first notch 133 (FIG. 6), and the first notch 133 faces a first direction D1. Each of the second elastic sheets 132 has a C-shaped cross-section and a second notch 134 (FIG. 6), and the second notch 134 faces a second direction D2 opposite to the first direction D1.

In other words, when the first elastic sheets 131 and second elastic sheets 132 are partially overlapped and cover the circumference of the rotating member 110 (FIG. 6), the first notches 133 and the second notches 134 are oriented in different directions. That is, a region of the circumference of the rotating member 110 that the first notches 133 of the first elastic sheet 131 corresponds to is different from another region of the circumference of the rotating member 110 that the second notches 134 of the second elastic sheet 132 corresponds to.

It is particularly worth noting that the shock absorbing assembly 130 in the embodiment is at least partially fixed to the cover 120 and does not rotate with the rotating member 110. Specifically, the shock absorbing assembly 130 includes at least one fixed section 135 (FIG. 4). The fixed section 135 is, for example, a convex portion. An inner wall of the second end 122 of the cover 120 has a fifth fixed portion 124 corresponding to the fixed section 135 (FIG. 3), and the fifth fixed portion 124 is, for example, a concave portion. The fixed section 135 of the shock absorbing assembly 130 may be engaged with the fifth fixed portion 124 of the cover 120 to fix the shock absorbing assembly 130 in the cover 120, so that the shock absorbing assembly 130 does not rotate with the rotating member 110. Of course, the manner in which the shock absorbing assembly 130 is assembled on the cover 120 is not limited thereto.

FIG. 7 is a partial schematic view of the shock absorbing assembly of the handlebar stabilizer of FIG. 4 from another angle of view. Referring to FIG. 5 and FIG. 7, the first pushing end 113 and the second pushing end 114 abut against the inner circumference of the shock absorbing assembly 130.

Since the shock absorbing assembly 130 does not rotate with the rotating member 110, the first radial axis R1 of the shock absorbing assembly 130 is parallel to the first direction D1 and the second direction D2 in the initial state, and when the steerer tube 210 (FIG. 3) drives the rotating member 110 to rotate (when turning to position S, for example), the first radial axis R1' is no longer parallel to the first direction D1 and the second direction D2. Thus, the first pushing end 113 and the second pushing end 114 of the outer edge 111 push the shock absorbing assembly 130, and a first frictional force F1, whose direction is opposite to a rotation direction T of the rotating member 110, is generated on the surface of the rotating member 110 (FIG. 5), providing a portion of resistance to stabilize the steerer tube 210.

On the other hand, the shock absorbing assembly 130 also includes at least one outwardly extending section 136 (FIG. 7). When the outer edge 111 of the rotating member 110 abuts against the outwardly extending section 136 of the shock absorbing assembly 130, the outwardly extending section 136 of the shock absorbing assembly 130 extends outwardly in the radial direction R of the rotating member 110. Specifically, the first elastic sheets 131 is formed with a first moving end 137 (FIG. 7), the second elastic sheets 132 is formed with a second moving end 138 (FIG. 7), and the first moving end 137 of the first elastic sheet 131 and the second moving end 138 of the second elastic sheet 132 are at least partially overlapped to form the outwardly extending section. Furthermore, the first elastic sheet 131 and the second elastic sheet 132 have a notch design, so that the first elastic sheet 131 and the second elastic sheet 132 are provided with elasticity to expand in the radial direction R of the rotating member 110. Thereby, when the first elastic sheet 131 and the second elastic sheet 132 are pushed by the rotating member 110, the partially alternatively stacked portions of the first elastic sheets 131 and the second elastic sheets 132 generate progressive resistance due to relative stretching, providing shock-absorbing resistance when the steerer tube 210 rotates, further enhancing the stability of the steerer tube 210 when the vehicle body is moving and the user's comfort.

It is worth noting that the first notch 133 of the first elastic sheet 131 and the second notch 134 of the second elastic sheet 132 are disposed in opposite directions, helping increase the partially alternatively stacked area between the first elastic sheet 131 and the second elastic sheet 132. Such a design may effectively increase the resistance for outwardly stretching and further improve the stability of the steerer tube 210, without increasing the size of the first elastic sheet 131 and the size of second elastic sheet 132.

FIG. 8 is a schematic view of the rotating member of the handlebar stabilizer in FIG. 4 from another angle of view. Referring to FIG. 8, the rotating member 110 has at least one recess 116 in the embodiment. The recess 116 is coated with damping grease and may be applied to increase the resistance between the rotating member 110 and the shock absorbing assembly 130 (FIG. 6). The damping grease in the embodiment is, for example, dimethyl damping grease, but the type of damping grease is not limited thereto. In addition, the damping grease may also be applied between the first elastic sheet 131 (FIG. 7) and the second elastic sheet 132 (FIG. 7) of the shock absorbing assembly 130 to increase the resistance between the first elastic sheet 131 and the second elastic sheet 132, thereby increasing the stability of the steerer tube 210 (FIG. 1).

The handlebar stabilizer of the invention is adapted to be disposed on the vehicle frame, including the rotating member, the cover, and the shock absorbing assembly. The rotating member is sleeved on and linked with the steerer tube of the vehicle frame. The outer edge is formed on the circumference of the rotating member. The shock absorbing assembly includes at least one outwardly extending section and at least one fixed section, and is disposed around the rotating member. When the steerer tube drives the rotating member to rotate, the outer edge of the rotating member abuts against the at least one outwardly extending section of the shock absorbing assembly, and thus the outer edge is resisted, and the at least one outwardly extending section of the shock absorbing assembly extends outwardly in the radial direction of the rotating member, resulting in progressive resistance. Therefore, the high-frequency wobbling of the steerer tube may be reduced to realize stability, enhancing the user's comfort.

Although the invention has been described with reference to the above embodiments, they are not intended to limit the invention. It will be apparent to those skilled in the art that various modifications and variations can be made to the disclosed embodiments without departing from the scope or spirit of the disclosure. Accordingly, the scope of the invention is defined by the attached claims not by the above detailed descriptions.

What is claimed is:

1. A handlebar stabilizer, wherein the handlebar stabilizer is adapted to be disposed on a vehicle frame, the vehicle frame comprises a steerer tube and a head tube, the steerer tube and the head tube are disposed coaxially, the head tube is sleeved on the steerer tube, and the handlebar stabilizer comprises:

a rotating member, sleeved on the steerer tube and connectable to the steerer tube, wherein an outer edge is formed on a circumference of the rotating member;

a cover, disposed on the rotating member and connectable to the head tube; and a shock absorbing assembly, disposed around the rotating member and comprising at least one outwardly extending section and at least one fixed section, wherein the at least one fixed section of the shock absorbing assembly is fixed to the cover, when the outer edge of the rotating member abuts against the at least one outwardly extending section of the shock absorbing assembly, the at least one outwardly extending section of the shock absorbing assembly extends outwardly in a radial direction of the rotating member, wherein the shock absorbing assembly comprises at least one first elastic sheet and at least one second elastic sheet at least partially alternatively stacked, each of the at least one first elastic sheet comprises a first notch, each of the at least one second elastic sheet comprises a second notch, and the first notch and the second notch are oriented in different directions.

2. The handlebar stabilizer according to claim 1, wherein a cross section of each of the at least one first elastic sheet and a cross section of each of the at least one second elastic sheet of the shock absorbing assembly are C-shaped, each of the at least one first elastic sheet is formed with a first moving end, the at least one second elastic sheet is formed with a second moving end, the first moving end of the at least one first elastic sheet and the second moving end of the at least one second elastic sheet are at least partially overlapped to form the outwardly extending section.

3. The handlebar stabilizer according to claim 1, wherein a region of the circumference of the rotating member that the first notch of the at least one first elastic sheet corresponds to is different from a region of the circumference of the rotating member that the second notch of the at least one second elastic sheet corresponds to.

4. The handlebar stabilizer according to claim 1, wherein the rotating member has a first radial axis and a second radial axis, a length of the first radial axis is greater than a length of the second radial axis, and the outer edge is formed on the first radial axis.

5. The handlebar stabilizer according to claim 1, wherein the head tube has an opening end, a cup assembly is fixed to the head tube and is located at the opening end, the steerer tube extends from the opening end, the handlebar stabilizer is disposed at one end of the cup assembly in an axial direction of the opening end, and the handlebar stabilizer and the cup assembly are coaxially disposed.

6. The handlebar stabilizer according to claim 5, wherein the cover has a first end and a second end opposite to each other in an extension direction, and the second end of the cover has a first fixed portion, the cup assembly has a third end and a fourth end opposite to each other in the extension direction, the third end of the cup assembly has a second fixed portion, and the first fixed portion of the cover is fixed to the second fixed portion of the cup assembly.

7. The handlebar stabilizer according to claim 1, wherein the outer edge comprises a first pushing end and a second pushing end opposite to each other, the first pushing end and the second pushing end abut against an inner circumference of the shock absorbing assembly.

8. The handlebar stabilizer according to claim 1, further comprising a collar, wherein the collar is sleeved on and fixed on the steerer tube.

* * * * *